US012728559B2

(12) United States Patent
Roleder

(10) Patent No.: US 12,728,559 B2
(45) Date of Patent: Sep. 8, 2026

(54) SYSTEM AND METHOD FOR RECYCLING A BARREL

(71) Applicant: Jonathan William Roleder, St Helena, CA (US)

(72) Inventor: Jonathan William Roleder, St Helena, CA (US)

(*) Notice: Subject to any disclaimer, the term of this patent is extended or adjusted under 35 U.S.C. 154(b) by 0 days.

(21) Appl. No.: 18/873,322

(22) PCT Filed: Jun. 9, 2023

(86) PCT No.: PCT/US2023/024977
§ 371 (c)(1),
(2) Date: Dec. 9, 2024

(87) PCT Pub. No.: WO2023/239932
PCT Pub. Date: Dec. 14, 2023

(65) Prior Publication Data

US 2025/0360647 A1 Nov. 27, 2025

Related U.S. Application Data

(60) Provisional application No. 63/350,962, filed on Jun. 10, 2022.

(51) Int. Cl.
*B27H 3/02* (2006.01)
*B65D 6/34* (2006.01)
*B65D 8/00* (2006.01)

(52) U.S. Cl.
CPC ................. *B27H 3/02* (2013.01); *B65D 9/04* (2013.01); *B65D 9/34* (2013.01)

(58) Field of Classification Search
CPC ... B27H 3/02; B27H 5/04; B27H 5/08; B65D 9/04; B65D 9/34; B27F 1/08
See application file for complete search history.

(56) References Cited

U.S. PATENT DOCUMENTS 1,441,579 A * 1/1923 Hatcher .................. B65D 9/14
217/44
1,513,711 A * 10/1924 Mcclenny ............... B65D 9/04
147/1
6,898,834 B1 5/2005 Warren
(Continued)

FOREIGN PATENT DOCUMENTS

CA 2275836 C 9/2008
WO WO-2008050306 A1 * 5/2008 ............... B65D 9/04

*Primary Examiner* — Shawn M Braden
(74) *Attorney, Agent, or Firm* — Kumar Maheshwari; Mahesh Law Group PC

(57) ABSTRACT

Systems and methods for merging recycling a barrel are disclosed. The method includes removing one or more barrel bands from the barrel that holds one or more barrel staves radially around a circumference of the barrel. The one or more barrel bands are removed by sliding from an inner position on an outside of the barrel to a smaller end portion of the barrel. The method further includes reversing an arc of the one or more barrel staves. The method further includes determining a joint side angle of the one or more barrel staves. In addition, the method includes machining the joint side angle on two longitudinal sides of the barrel staves such that the barrel staves are assembled into a recycled barrel such that the outside of the barrel staves faces an inside of the recycled barrel.

19 Claims, 10 Drawing Sheets

(56) References Cited

U.S. PATENT DOCUMENTS

| | | | | |
|---|---|---|---|---|
| 8,181,408 | B1 * | 5/2012 | Triglia | E04F 15/04 52/311.1 |
| 2011/0000885 | A1 | 1/2011 | Kenealy et al. | |
| 2012/0088018 | A1 * | 4/2012 | Lix | C12H 1/22 451/28 |
| 2019/0322967 | A1 * | 10/2019 | Lutz | C12G 3/07 |

* cited by examiner

SYSTEM AND METHOD FOR RECYCLING A BARREL

CROSS REFERENCE TO PRIOR APPLICATION

This application is a National Stage application of the International Application No. PCT/US23/24977, entitled as "SYSTEMS AND METHODS FOR RECYCLING A BARREL", filed Jun. 9, 2023, which claims the benefit of U.S. Provisional Patent Application No. 63/350,962, entitled as "SYSTEM AND METHOD FOR RECYCLING A BARREL", filed Jun. 10, 2022, which are incorporated by reference in their entirety.

FIELD

This disclosure relates to wooden barrels. More particularly, the disclosure relates to a process and technique in which a wooden barrel of multiple sizes and shapes can be turned inside out.

BACKGROUND

Wooden barrels are hollow cylindrical containers for storing large quantities of liquids, alcoholic beverages, oils, and the like. Apart from storage, wooden barrels are also used for shipping large amounts of liquids nationally and internationally. Wooden barrels generally have a life span of around 4-6 years. One reason for the short life span of the wooden barrels is that wood pores tend to become clogged with the liquid stored inside the barrel. This causes the wooden barrel to become less secure, due to which its value my reduce over time. Thus, there is a need for a solution to improve the sustainability and life span of wooden barrels.

SUMMARY

The disclosed subject matter relates to a method for recycling a barrel. The method includes removing one or more barrel bands from the barrel that holds one or more barrel staves radially around a circumference of the barrel. The one or more barrel bands are removed by sliding from an inner position on an outside of the barrel to a smaller end portion of the barrel. The method further includes reversing an arc of the one or more barrel staves. The method further includes determining a joint side angle of the one or more barrel staves. In addition, the method includes machining the joint side angle on two longitudinal sides of the barrel staves such that the barrel staves are assembled into a recycled barrel such that the outside of the barrel staves faces an inside of the recycled barrel.

In accordance with the aspects of the disclosure, the method further includes sanitizing the barrel prior to removing the one or more barrel bands from the barrel.

In accordance with the aspects of the disclosure, the method further includes steaming each barrel stave and causing each barrel stave to be bent into a semi-flat position.

In accordance with the aspects of the disclosure, the joint side angle is determined by dividing 360 degrees by a product of a number of barrel staves and two.

In accordance with the aspects of the disclosure, the method further includes removing a layer of wood from the outside of the one or more barrel staves. The layer is between about 2 mm to about 4 mm.

In accordance with the aspects of the disclosure, the method further includes positioning two groze grooves on the inside of the barrel staves. The two groze grooves comprise an inside upper groze groove near a top end of the barrel staves and an inside lower groze groove near a bottom end of the barrel staves. The method further includes positioning two new groze grooves on the outside of the barrel staves after the arc of the barrel staves is reversed. The two new groze grooves comprise an outside upper groze groove near a second top end of the barrel staves and an outside lower groze groove near a second bottom end of the barrel staves. In addition, the method includes cutting the two groze grooves on the inside of the barrel staves once the two new groze grooves are positioned.

In accordance with the aspects of the disclosure, the second top end is between about 25 mm to about 30 mm further inward than the top end.

In accordance with the aspects of the disclosure, the second bottom end is between about 25 mm to about 30 mm further inward than the bottom end.

In accordance with the aspects of the disclosure, the method further includes machining an upper headboard of the barrel to create a joint connection between the upper headboard and the outside upper groze groove of each of the barrel staves. The method further includes machining a lower headboard of the barrel to create a joint connection between the lower headboard and the outside lower groze groove of each of the barrel staves. The recycled barrel comprises the upper headboard and the lower headboard.

In accordance with the aspects of the disclosure, the recycled barrel has a smaller radius than the barrel.

In accordance with the aspects of the disclosure, the recycled barrel comprises a strength band that is positioned at each end of the recycled barrel.

In accordance with the aspects of the disclosure, each strength band has a cross-section that includes a first portion that is positioned against the barrel stave and a second portion that is oriented perpendicular to a longitudinal axis of the recycled barrel.

In accordance with the aspects of the disclosure, the first portion and second portion of the cross-section are oriented to form an "L" shape.

The disclosed subject matter also relates to a barrel. The barrel includes one or more barrel staves. The barrel staves include recycled barrel staves that were previously removed from a salvaged barrel. The barrel further includes one or more barrel bands that hold the one or more barrel staves around a circumference of the barrel. The recycled barrel staves are reversed such that their inner side faces an outside of the salvaged barrel.

In accordance with the aspects of the disclosure, the barrel staves comprise a top end, a bottom end, two outside groze grooves, and two new inside groove grooves.

In accordance with the aspects of the disclosure, the the two groze grooves include an inside upper groze groove near a top end of the barrel staves and an inside lower groze groove near a bottom end of the barrel staves. The two new groze grooves include an outer upper groze groove near a second top end of the barrel staves and an outer lower groze groove near a second bottom end of the barrel staves. In accordance with the aspects of the disclosure, the inside upper groze groove of each of the recycled barrel staves is positioned further from the top end than an outside upper groze groove that is on the outer side. The inside lower groze groove of each of the recycled barrel staves is positioned further from the bottom end than an outside lower groze groove that is on the outer side.

In accordance with the aspects of the disclosure, the inside upper groze groove of each of the recycled barrel staves is between about 25 mm and about 30 mm further from the top end than the outside upper groze groove. The inside lower groze groove of each of the recycled barrel staves is between about 25 mm and about 30 mm further from the bottom end than the outside lower groze groove.

In accordance with the aspects of the disclosure, further including a strength band that is positioned at each end of the barrel. Each strength band has a cross-section that includes a first portion that is positioned against the side of the barrel and a second portion that is oriented perpendicular to a longitudinal axis of the barrel. The first portion and second portion of the cross-section are oriented to form an "L" shape.

The disclosed subject matter also relates to a method for recycling a barrel. The method includes removing one or more barrel bands from the barrel that holds one or more barrel staves radially around a circumference of the barre. The one or more barrel bands are removed by sliding from an inner position on an outside of the barrel to a smaller end portion of the barrel. The barrel staves comprise recycled barrel staves that were previously removed from a salvaged barrel. The method further includes reversing an arc of the one or more barrel staves. The method further includes positioning two groze grooves on the inside of the barrel staves. The two groze grooves comprise an inside upper groze groove near a top end of the barrel staves and an inside lower groze groove near a bottom end of the barrel staves. The method further includes positioning two new groze grooves on the outside of the barrel staves. The two new groze grooves comprise an outside upper groze groove near a second top end of the barrel staves and an outside lower groze groove near a second bottom end of the barrel staves, The second top end is between about 25 mm to about 30 mm further inward than the top end. Further, the second bottom end is between about 25 mm to about 30 mm further inward than the bottom end. The method further includes cutting the two outside groze grooves on the outside of the barrel staves once the two new inside groze grooves are positioned. The method further includes machining an upper headboard of the barrel to create a joint connection between the upper headboard and the outside upper groze groove of each of the barrel staves. In addition, the method includes machining a lower headboard of the barrel to create a joint connection between the lower headboard and the outside lower groze groove of each of the barrel staves. The recycled barrel comprises the upper headboard and the lower headboard.

DETAILED DESCRIPTION

Figure 1:
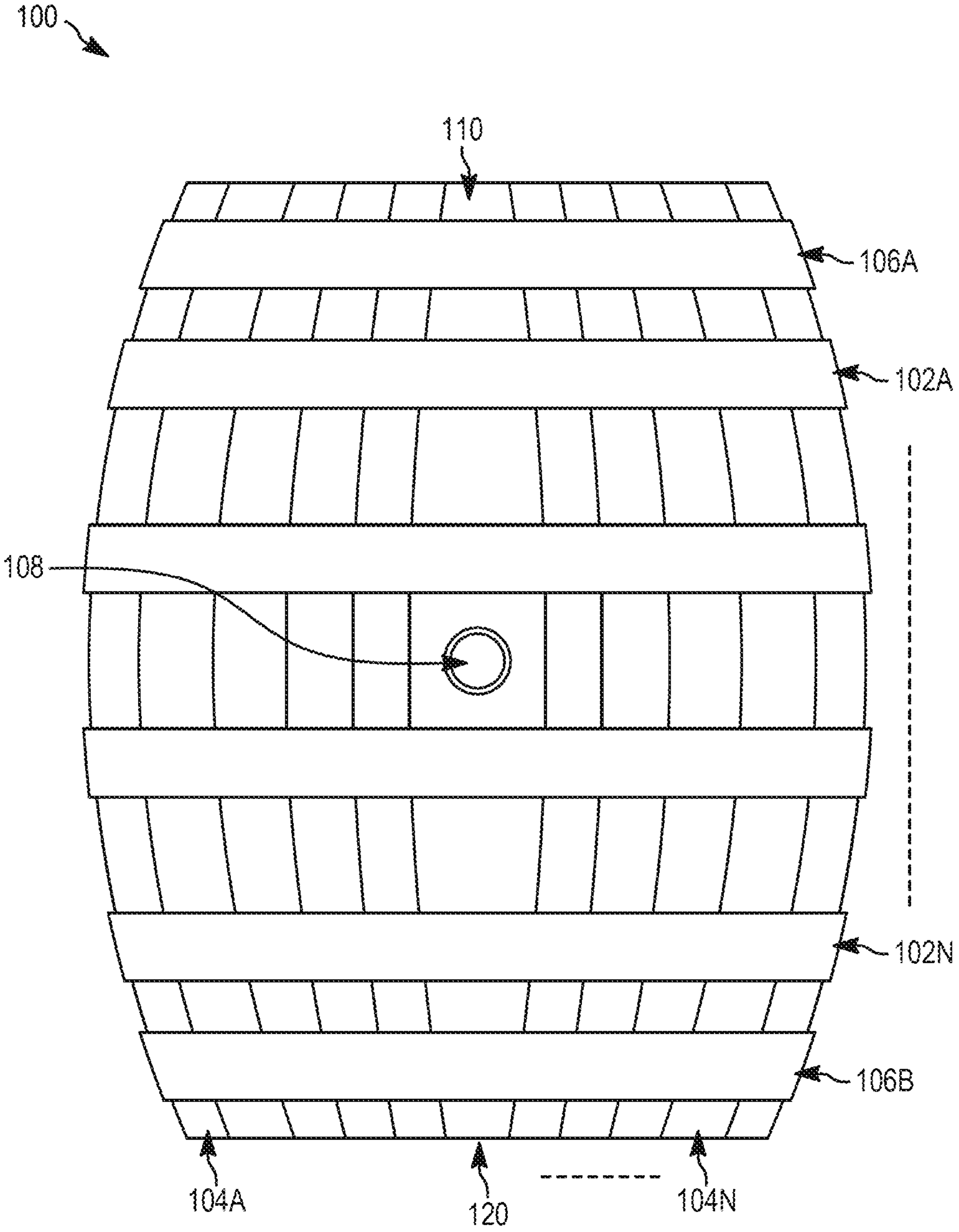
FIG. 1 illustrates a front view of a barrel, in accordance with an embodiment of the present disclosure.

Embodiments of the present disclosure will now be described with reference to the accompanying drawing.

Embodiments are provided to convey the scope of the present disclosure thoroughly and fully to the person skilled in the art. Numerous details are set forth relating to specific components and methods to provide a complete understanding of the embodiments of the present disclosure. It will be apparent to the person skilled in the art that the details provided in the embodiments may not be construed to limit the scope of the present disclosure. In some embodiments, well-known processes, apparatus structures, and techniques should be described in detail.

The terminology used in the present disclosure is to explain a particular embodiment, and such terminology may not be considered to limit the scope of the present disclosure. As used in the present disclosure, the forms "a," "an," and "the" may be intended to include the plural forms as well, unless the context clearly suggests otherwise. The terms "comprises," "comprising," "including," and "having," are open ended transitional phrases and therefore specify the presence of stated features, elements, modules, units and/or components, but do not forbid the presence or addition of one or more other features, elements, components, and/or groups thereof. The particular order of steps disclosed in the method and process of the present disclosure is not to be construed as requiring their performance as described or illustrated. It is also to be understood that additional or alternative steps may be employed.

The systems and methods described herein discloses a process and technique in which a wooden barrel may be turned inside out. The wooden barrel can be of multiple sizes and shapes. The barrel holds one or more liquids, such as water, wine, juices, and the like. The barrel includes barrel bands that holds barrel staves radially around a circumference of the barrel. The turning process includes the steps of removing the barrel bands by sliding from an inner position of the barrel to an outside of the barrel, reversing an arc of the barrel staves once removed from the barrel bands, determining a joint side angle of the barrel staves once reversed, and machining the joint side angle on two longitudinal sides of the barrel staves such that the barrel is assembled into a recycled barrel. In the assembled recycled barrel, the outside portion of the barrel staves are reversed and now face an inside of the barrel. More details of the process are explained in the below paragraphs. Further, because the joint sides of the staves are machined, the recycled barrel may have a smaller radius than the original barrel.

The relevance of this process of turning the barrel inside out is that the outside wood of the barrel is still perfectly usable. The process of turning the barrel inside out results in a recycled wood barrel that has the same characteristics as a new wine barrel or the barrel before being turned inside out. Since the exterior of the barrel has not been exposed to the aging and storing process of the liquid, the wood is like new wood on the outside of the barrel. Further, the liquid inside of the barrel rarely penetrates more than 3 mm-4 mm deep into the surface of the interior stave wall. When considering the sustainability aspect of the barrel industry, this process significantly increases the lifespan of the barrel. This leads to a reduced carbon footprint and conserved tree harvesting from which the barrels are made.

Referring to FIG. 1, FIG. 1 illustrates a front view of a barrel 100, in accordance with an embodiment of the present disclosure. As shown, the front view of the barrel 100 includes one or more barrel bands 102A-102N, one or more barrel staves 104A-N, a first strength band 106A, a second strength band 106B, a bung hole 108, a top end 110, and a bottom end 120. The one or more barrel bands 102A-102N and strength bands 106A, 106B encircle around a circumference of the barrel 100. In an example, the barrel staves 104A-N may include recycled barrel staves that were previously removed from a salvaged barrel. The barrel staves 104A-N are arranged circumferentially to form a side of the barrel 100. As shown, the barrel 100 of FIG. 1 has six total bands. The six bands include four barrel bands 102A-102N, the first strength band 106A, and the second strength band 106B. Three barrel bands 102A-102N are on an outside of the barrel 100. The barrel bands 102A-102N nearer to the head of the barrel 100 are also referred to as head bands and the barrel bands 102A-102N nearer to the center section of the barrel 100 are referred to as middle bands or mid-section bands. The barrel bands 102A-102N, the first strength band 106A, and the second strength band 106B may also be referred to as barrel hoops. Further, the one or more barrel bands 102A-N are removed by sliding from an inner position on an outside of the barrel 100 to a smaller end portion of the barrel 100.

In an embodiment, the first strength band 106A is positioned at the top end 110 of the barrel 100 and the second strength band 106B is positioned at the bottom end 120 of the barrel 100. The first strength band 106A and the second strength band 106B are installed and pinned into the wood of the barrel 100. This makes the barrel 100 firmer and concentrates its stacking weight. The sacking weight may be concentrated even when the barrel 100 is bearing multiple loads.

In an embodiment, the bung hole 108 may be a hole bored to remove excess liquid within the barrel 100. In this way, possibilities of excess capacity of the liquid and excess weights of the barrel 100 are prevented. The bung hole 108 may be positioned in the center of the barrel 100 and may be circular in shape.

Figure 2:
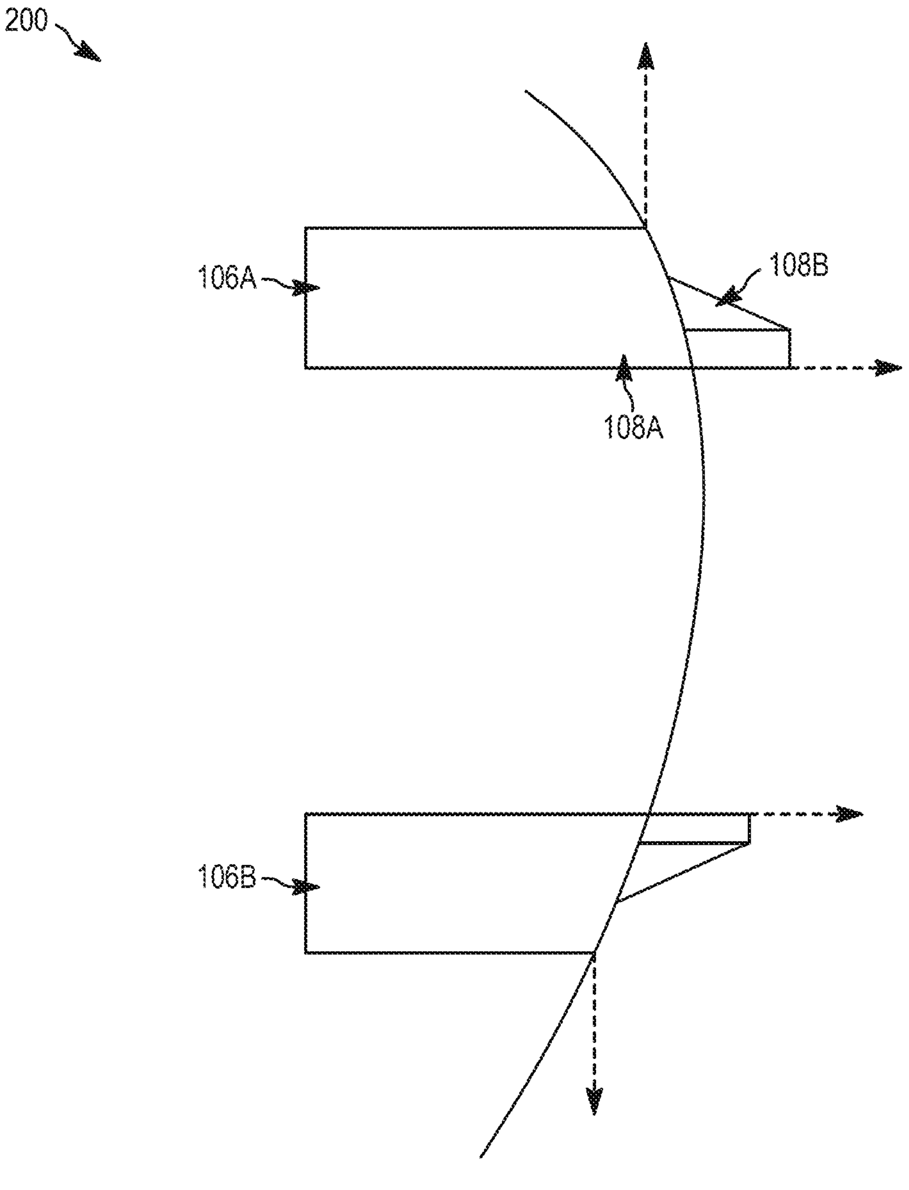
FIG. 2 illustrates a view of portions of strength bands that are shaped to form an "L" shape, in accordance with an embodiment of the present disclosure.

Referring to FIG. 2, FIG. 2 illustrates a view of portions of strength bands 106A-B that are shaped to form an "L" shape, in accordance with an embodiment of the present disclosure. In various embodiments, the recycled barrel may not include a strength band. Each strength band 106A-106B has a cross section that includes a first portion 108A and a second portion 108B. The first portion 108A is positioned against the side of the barrel 100 and the second portion 108B is orientated perpendicular to a longitudinal axis of the barrel 100. Further, the first portion 108A and the second portion 108B of the cross section are oriented to form an "L" shape. Formation of such an "L" shape enables the barrel 100 to be able to withstand a greater stacking compression load. Thus, the barrel 100 is of a greater strength and can withstand higher loads when compared with conventional barrels.

Figure 3A:
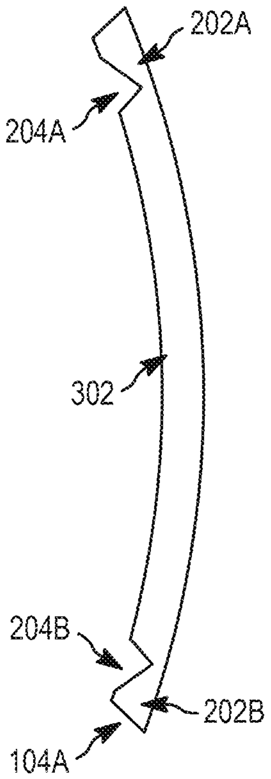
FIG. 3A illustrates a view of a barrel stave of the barrel before being removed from the barrel in accordance with an embodiment of the present disclosure.

Referring to FIG. 3A, FIG. 3A illustrates a view of a barrel stave 104A of the barrel 100 before being removed from the barrel 100. As shown, the barrel stave 104A includes a top end 202A, a bottom end 202B, and two groze grooves 204A-204B created on an inside 302 of the barrel stave 104A. The two groze grooves 204A-B include an inside upper groze groove 204A and an inside lower groze groove 204B. The inside upper groze groove 204A is positioned near the top end 202A of the barrel stave 104A and the inside lower groze groove 204B is positioned near the bottom end 202B of the barrel stave 104A. The two groze grooves 204A-204B may be a narrow indentation that is built into the inside of the barrel stave 104A. The main purpose for having the two groze grooves 204A-204B is to allow other components or materials (for example, headboards) to be guided into it. The headboards seal the ends of the barrel and help in securely holding the barrel staves 104A-104N in their respective places, thereby increasing the strength of the barrel 100.

The joint connection between the barrel head and the barrel staves in the disclosed subject matter is not limited to groze grooves. In various embodiments, other joining such as male/female joints may be used. Examples of other types of joints include but are not limited to tongue and grove joints and barrel chimes.

Figure 3B:
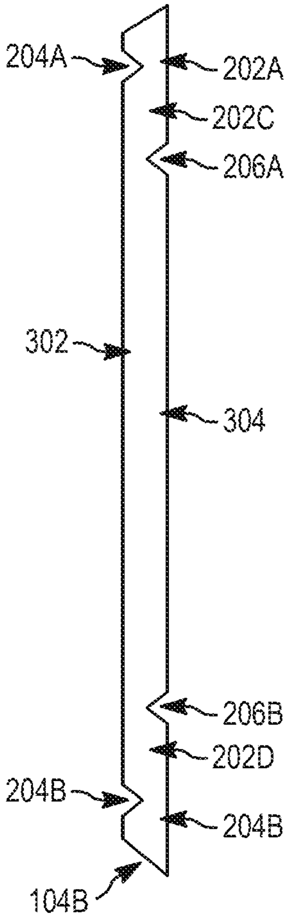
FIG. 3B illustrates a view of the barrel stave after being reversed in which two new groze grooves are created on an outside of the barrel stave, in accordance with an embodiment of the present disclosure.

Referring to FIG. 3B, FIG. 3B illustrates a view of the barrel stave 104B after being reversed in which two new groze grooves 206A-206B are created on an outside 304 of the barrel stave 104B, in accordance with an embodiment of the present disclosure. In an embodiment, the new groze grooves 206A-B includes an outside upper groze groove 206A and an outside lower groze groove 206B. The outside upper groze groove 206A is positioned near a second top end 202C of the barrel stave 104B and the outside lower groze groove 206B is positioned near the second bottom end 202D of the barrel stave 104B. When the barrel stave 104A (for FIG. 3A) is reversed, the two groze grooves 204A-204B will be on the wrong side. That is the reason for creating the two new groze grooves 206A-206B on the opposite side of the stave. Further, the second top end 202C is between about 25 mm to about 30 mm further inward than the top end 202A, and the second bottom end 202D is between about 25 mm to about 30 mm further inward than the bottom end 202B. In another embodiment, the second top end 202C is between about 5 mm to about 30 mm further inward than the top end 202A, and the second bottom end 202D is between about 5 mm to about 30 mm further inward than the bottom end 202B. In another embodiment, the second top end 202C is between about 10 mm to about 30 mm further inward than the top end 202A, and the second bottom end 202D is between about 10 mm to about 30 mm further inward than the bottom end 202B.

The outside upper groze groove 206A of the barrel stave 104B is positioned further from the top end 202A than the inside upper groze groove 204A that is on the inside 302 of the barrel stave 104B. In an example, the inside upper groze groove 204A is between about 25 mm and about 30 mm, between about 5 mm and about 30 mm, or between about 10 mm and about 30 mm further from the top end 202A than the outside upper groze groove 206A. Further, the inside lower groze groove 204B of the barrel stave 104B is positioned further from the bottom end 202B than the outside lower groze groove 206B. In an example, the inside lower groze groove 204B of the barrel stave 104B is between about 25 mm and about 30 mm, between about 5 mm and about 30 mm, or between about 10 mm and about 30 mm further from the bottom end 202B than the outside lower groze groove 206B.

One problem with creating the new groze grooves 206A-206B on the opposite side of each barrel stave 104B is that the placement of the two groze grooves 204A-204B close to one another would necessarily weaken the barrel stave 104B at that location. The problem of weakening the stave with additional groze grooves 204A-204B can then be solved by moving the new groze grooves 206A-206B inward relative to the original groze grooves. Placement of the two new groze grooves 206A-B between about 25 mm to about 30 mm away from the top end 202A/bottom end 202B helps in maintaining the strength of the barrel stave 104B. As the barrel head position is moved inward, the diameter and circumference of an interior of the barrel 100 increases due to its natural barrel arching shape. The barrel staves 104A-104N of the barrel 100 are machined to allow them to fit in a reverse barrel shape, which reduces the width of each barrel stave 104A-104N. In one embodiment, only the original barrel staves 104A-104N are used, which decreases the circumference of the barrel 100 since the sides of each stave 104A-104N are machined. In another embodiment, additional barrel staves 104A-104N are added to maintain the original circumference of the barrel 100.

By adding additional barrel staves and moving the groze grooves inward, the circumference of the barrel head board necessarily increases. The solution may be to replace the barrel head board with a new larger diameter and circumference barrel head (located 1" inward). In this embodiment, additional staves are added to the barrel 100. The positive result from this solution is maintaining the interior volume capacity of the barrel 100 by increasing the barrel body circumference. This solution can maintain the interior volume of the barrel 100 although it requires more wood than originally provided by the barrel 100.

Due to the reversal process, the dimensions of the barrel staves 104A-104N will change from their original size. The width of the barrel stave 104A is less than the original width. Since the new width of the barrel stave 104A is less, more barrel staves 104A-104N would be required to complete the original diameter and radial pattern of the barrel 100. In one embodiment, the barrel staves 104A-104N used may have smaller dimensions. Thus, the barrel 100 would be smaller in dimension and volume capacity. In another embodiment, additional barrel staves 104A-104N may be added to expand the barrel 100 that makes up for the lost width of the original barrel staves 104A-104N. This would require additional barrel staves 104A-104N beyond what was provided by the barrel 100 originally.

Figure 3C:
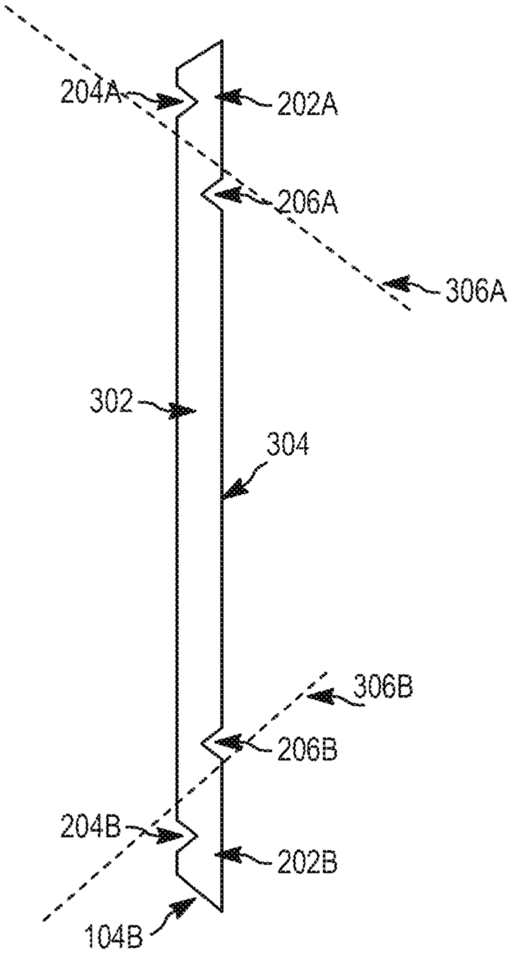
FIG. 3C illustrates a view of the barrel stave in which the two groze grooves are cut, in accordance with an embodiment of the present disclosure.

Referring to FIG. 3C, FIG. 3C illustrates a view of the barrel stave 104B in which the two groze grooves 204A-204B are cut, in accordance with an embodiment of the present disclosure. The inside upper groze groove 204A is cut at a first cut location 306A on the inside 302 of the barrel stave 104B. The inside lower groze groove 204B is cut at a second cut location 306B on the inside 302 of the barrel stave 104B. When the barrel stave 104A (for FIG. 3A) is reversed, the two groze grooves 204A-204B will be on the wrong side and serve no purpose as they are along the inside 302 of the barrel 100. The two outside groze grooves 204A-204B may be cut diagonally in which the top end 202A and the bottom end 202B are removed. Thus, the previous two groze grooves 204A-204B are cut at the respective cut locations 306A, 306B.

Figure 3D:
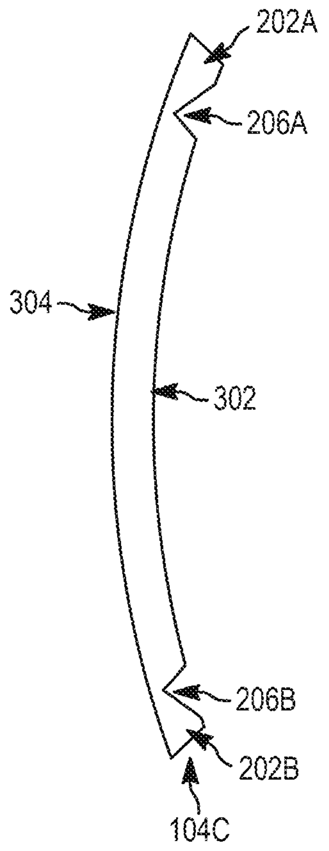
FIG. 3D illustrates a view of the barrel stave after being machined, in accordance with an embodiment of the present disclosure.
Figure 4:
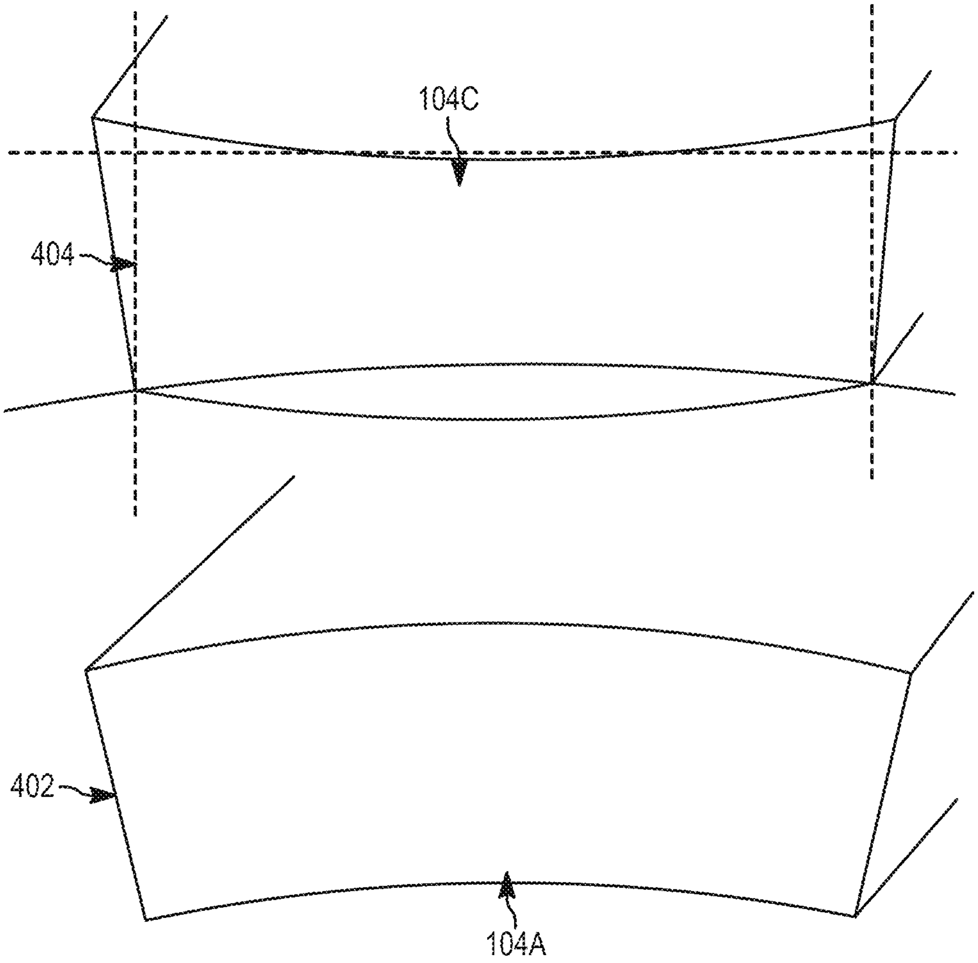
FIG. 4 illustrates a view of the joint sides of the barrel stave, in accordance with an embodiment of the present disclosure.

Referring to FIG. 3D, FIG. 3D illustrates a view of the barrel stave 104C after being machined, in accordance with an embodiment of the present disclosure. The barrel stave 104C shown in FIG. 3D is achieved once the barrel stave 104B is FIG. 3C is cut on the top end 202A and bottom end 202B along the inside 302. In an embodiment, the barrel stave 104B (of FIG. 3C) may be machined such that it can be assembled into a recycled barrel in which the barrel staves 104A-N are orientated circumferentially with the inside 302 opposite the outside 304 of the recycled barrel. The recycled barrel may have a smaller radius than the barrel 100 before the barrel staves 104A-104N were reversed. The goal for machining the barrel stave 104B is to remove as little material as possible while reversing a cupping. The term cupping, as used herein, refers to a curvature observed when viewing the staves from their longitudinal axis, as shown in FIG. 4. Each stave may be machined to reverse the cupping in order to align joint sides of the staves. When machined, the new barrel stave 104C (as shown in FIG. 3D) will have a slightly curved surface in the opposite direction. The surfacing for the machining process may be machined by either rotary planning or CNC surfacing. The slightly curved surface may be removed by sanding, sawing, CNC machining, and the like. In an example, removing no more than about 2 mm to about 4 mm of the material would be ideal to maintain the overall thickness of the barrel stave 104C.

Further, it may also be beneficial to expose fresh clean wood on the interior surface of the barrel 100, which will eventually be exposed to the liquid inside the barrel 100. A positive effect can come from reducing the thickness of the barrel staves 104A-104N on the barrel 100. For example, barrel staves 104A-104N are commonly 27 millimeters in thickness. A lower thickness of the barrel staves 104A-104N may accelerate the oxygen ingress and transfer. This increased oxygen transfer can have a positive softening effect on the liquid inside the barrel 100. The thicker the barrel staves 104A-104N are, the more the oxygen withheld from transferring through the barrel staves 104A-104N. The thinner the barrel staves 104A-104N are, the more oxygen transfer possible.

Referring to FIG. 4, FIG. 4 illustrates a view of joint sides 402, 404 of the barrel staves 104A and 104C, in accordance with an embodiment of the present disclosure. The joint sides 402, 404 may include a first joint side 402 associated with barrel stave 104A and a second joint side 404 associated with barrel stave 104C. After the reversal process, it is important to keep track of the different barrel staves 104A-104N of the barrel 100 with respect to which sides of the original barrel staves 104A-104N were exposed to one or more liquids inside the barrel 100, and which barrel staves 104A-104N were not exposed to the liquids inside the barrel 100.

One or more angles on the second joint side 404 of the barrel stave 104C are calculated and machined. The first angle to recalculate is the new joint side angle, which may be determined by counting the number of barrel staves 104A-N needed to complete the desired barrel diameter and radial pattern forming a complete circle. The formula for calculating the stave angle is (360 degrees divided by (the number of staves needed×2)=New Side Joint Angle). In an example, if the number of barrel staves is 24, then the new joint side angle is 360/(24 staves×2)=7.5-degree angle). This new joint side angle is machined on the two longitudinal sides of the barrel staves 104A-104N. This angle on both sides of the barrel staves 104A-N will yield a complete radial pattern with precise parallel joints between the barrel staves 104A-N, completing a 360-degree loop.

Figure 5:
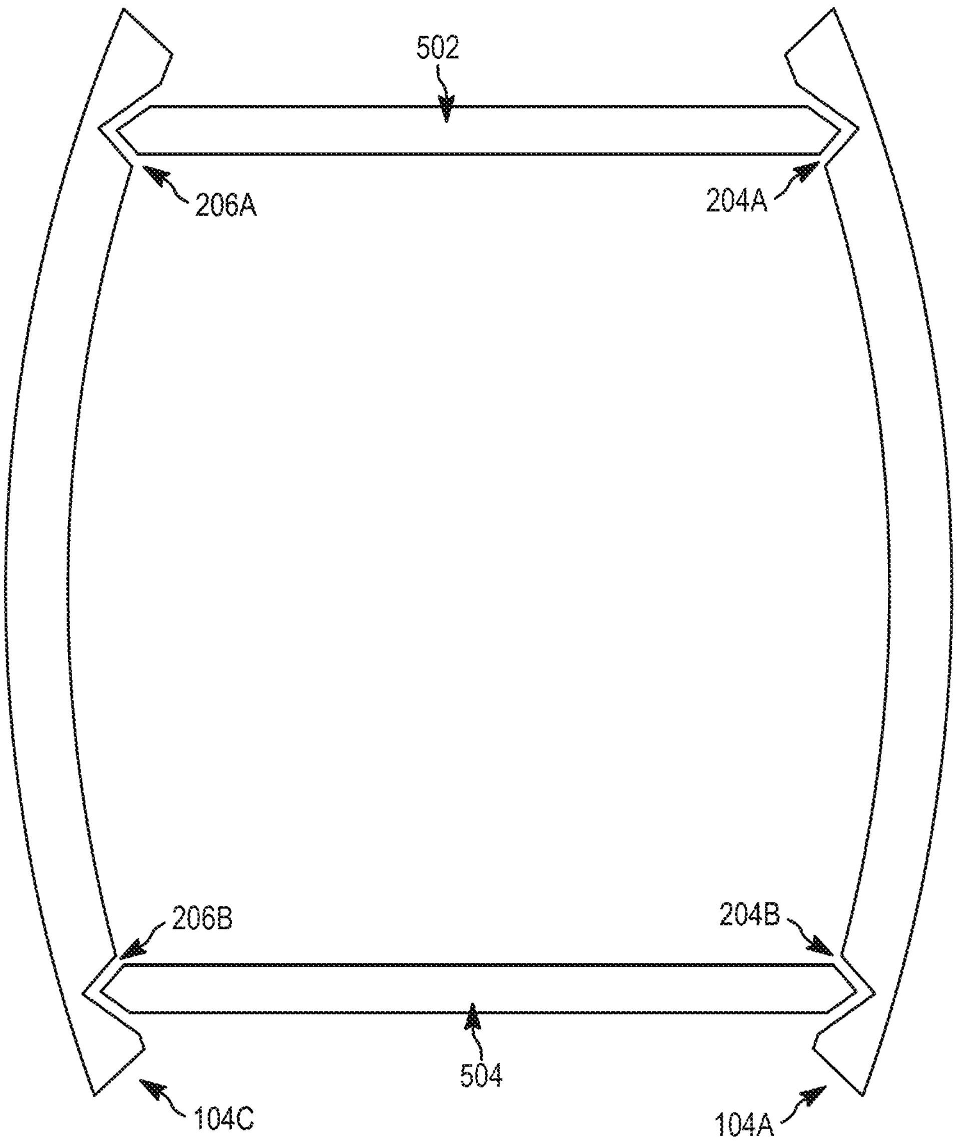
FIG. 5 illustrates a front view in which a joint connection is established between the barrel staves using headboards, in accordance with an embodiment of the present disclosure.

Referring to FIG. 5, FIG. 5 illustrates a front view in which a joint connection is established between the barrel staves 104A and 104C using headboards 502, 504, in accordance with an embodiment of the present disclosure. As shown, the headboards 502, 504 include an upper headboard 502 and a lower headboard 504. The upper headboard 502 creates a joint connection between the inside upper groze groove 204A of the barrel stave 104A and the outside upper groze groove 206A of the barrel stave 104C. Further, the lower headboard 504 creates a joint connection between the inside lower groze groove 204B of the barrel stave 104A and the outside lower groze groove 206B of the barrel stave 104C. The upper headboard 502 and the lower headboard 504 may both be part of the recycled barrel. The upper headboard 502 and the lower headboard 504 both assist in holding the barrel staves 104A-104N securely in place. The joint connections created by the headboard 502, 504 are shaped to retain liquid stored inside the barrel 100.

Further, it is common for unwanted microbial bacteria to develop on the inside and outside surfaces of barrels that are generally older. For this reason, a barrel may be cleaned/sanitized in order to remove as much bacteria as possible. An example of a cleaning process is accomplished using chemicals, hot water, steam, ozone, blue light sterilization, and fogging. The sanitizing & cleaning process may be performed prior to disassembly of the barrel 100 or after the components of the barrel 100 have been disassembled.

Other forms of exposure may also contaminate the headboards 502, 504. It is thus important to keep the headboards 502, 504 safe from such exposures as they may tend to damage the headboards 502, 504. Thus, about 1 mm to about 2 mm of material from the face of the new wood headboards 502, 504 is removed for creating a clean flat surface. This clean flat surface may then be sanded. Prior to the sanding, the clean flat surface may be surfaced for giving a cosmetic look and feel.

Figure 6:
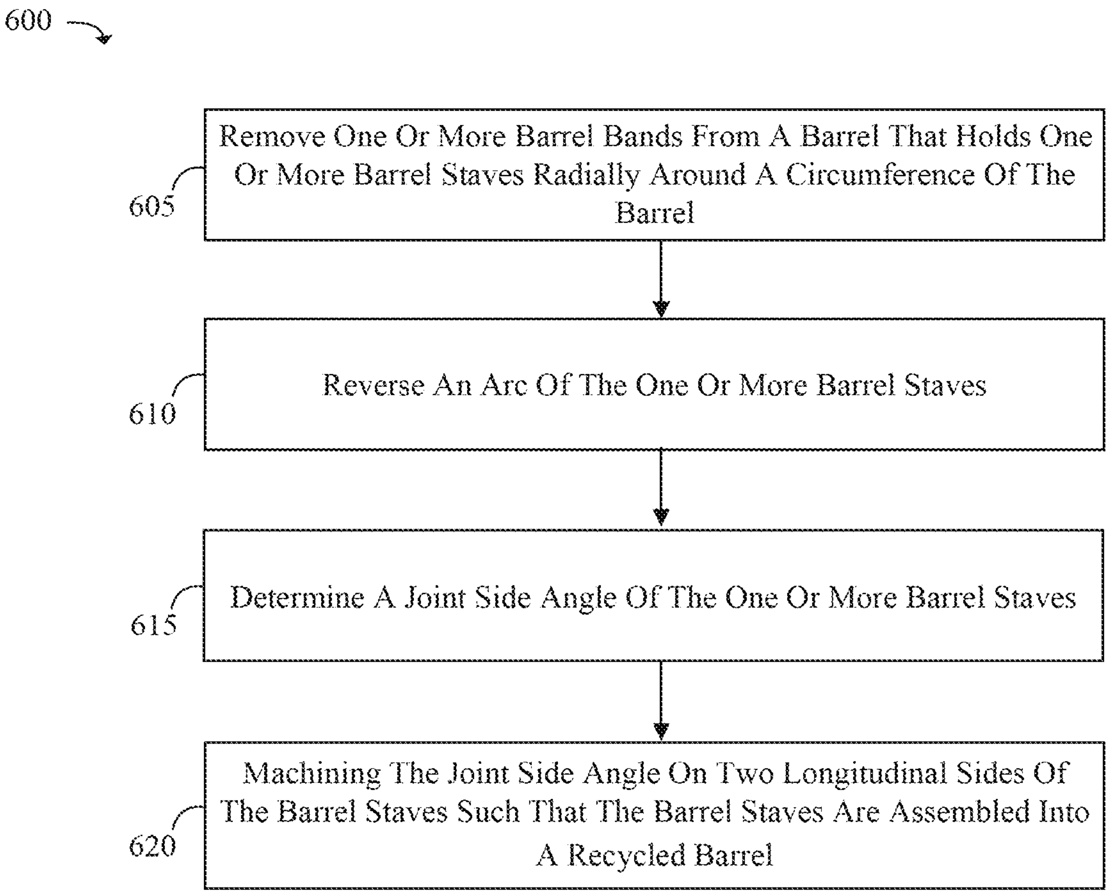
FIG. 6 illustrates a flowchart illustrating a method for recycling a barrel, in accordance with an embodiment of the present disclosure.

Referring to FIG. 6, FIG. 6 illustrates a flowchart illustrating a method 600 for recycling a barrel 100, in accordance with an embodiment of the present disclosure. Steps 605-620 of the method 600 are explained in further detail below.

At step 605, the barrel bands 102A-N are removed from the barrel 100 with barrel staves 104A-N oriented circumferentially to form a side of the barrel 100. The barrel bands 102A-102N may be removed by sliding from an inner position on an outside of the barrel 100 to a smaller end portion of the barrel 100. In an example, the barrel 100 may have around six bands including four barrel bands 102A-N and two strength bands 106A-B on the barrel 100, in which three bands are present on each side of the barrel 100. The strength bands 106A-B may also be removed from the barrel 100. The bands closer to the head of the barrel 100 are referred to as head bands and the bands closer to the center section of the barrel 100 are referred to middle bands or mid-section bands. The barrel bands 102A-102N and strength bands 106A-106B may also be referred to as barrel hoops.

Further, each strength band 106A-106B has a cross section that includes a first portion 108A and a second portion 108B. The first portion 108A is positioned against the side of the barrel 100 and the second portion 108B is orientated perpendicular to a longitudinal axis of the barrel 100. Further, the first portion 108A and the second portion 108B of the cross section are oriented to form an "L" shape. Formation of such an "L" shape enables the barrel 100 to withstand a greater stacking compression load. Thus, the strength bands 106A-106B increase the overall strength of the barrel 100 and compensates for losses in thickness of the barrel staves 104A-104N and the head board of the barrel 100.

Further, the barrel staves 104A-104N include an inner side facing an inner portion of the barrel 100, two joint sides 402, 404 (as shown in FIG. 4), an outer side facing an outside of the barrel 100, a top end 202A, a bottom end 202B, and two groze grooves 204A-204B (as shown in FIG. 3A). The two groze grooves 204A-204B include an inside upper groze groove 204A positioned near the top end 202A of the barrel 100 and an inside lower groze groove 204B positioned near the bottom end 202B of the barrel 100. The two groze grooves 204A-204B may be a narrow indentation that is built into the inside of the barrel stave 104A. The main purpose for having the two groze grooves 204A-204B is to allow other components or materials (for example, headboards) to be guided into it. The headboards help in securely holding the barrel staves 104A-104N in their respective places, thereby increasing the strength of the barrel 100. Further, the recycled barrel staves are reversed such that their inner side faces an outside of the salvaged barrel.

The barrel staves 104A-N are then removed from the barrel 100. Further, it is common for older oak barrels to develop unwanted microbial bacteria on the inside and outside surfaces. For this reason, it is important to sanitize and clean the barrel 100 in order to remove as much bacteria as possible. The cleaning process is accomplished using chemicals, hot water, steam, ozone, blue light sterilization, and fogging. The cleaning process is accomplished using chemicals, hot water, steam, ozone, blue light sterilization, and fogging. The sanitizing & cleaning process may be performed prior to disassembly of the barrel 100 or after the components of the barrel 100 have been disassembled.

At step 610, an arc of the barrel staves 104A-N is reversed. The barrel staves 104A-N have a curved longitude arc with the sides at a specific angle which when assembled in a radial pattern create the shape of the barrel 100. This longitudinal arc or radius of the barrel staves 104A-N needs to be reversed. This reversing of the arc may be accomplished by steaming the barrel staves 104A-N firstly flat. The barrel staves 104A-N will be subjected to warm/hot steam (typically a timed period in an enclosed chamber) in which the barrel staves 104A-N will be softened so it can be bent into a semi flat position. This flat orientation will allow for easier machining of the barrel staves 104A-N surface, side joint angle, overall profile, and length. The barrel staves 104A-N can also be steamed into a reverse arc past flat from its previous shape. This additional arcing of the radius past flat may be beneficial from a production and machine processing viewpoint. Typically, machining on a flat component is easier than machining on a component with curved arcs and radiuses.

At step 615, a joint side angle of the one or more barrel staves 102A-102N is determined. The joint side angle is determined by counting the number of barrel staves 104A-N needed to complete the desired barrel diameter and radial pattern forming a complete circle. The formula for calculating the stave angle is (360 degrees divided by (the number of staves needed×2)=New Side Joint Angle). In an example, if the number of barrel staves is 24, then the new joint side angle is 360/(24 staves×2)=7.5-degree angle).

At step 620, the new joint side angle determined in step 615 is machined on the two longitudinal sides of the barrel staves 104A-104N such that the barrel staves 104A-104N are assembled into a recycled barrel. This angle on both sides of the barrel staves 104A-N will yield a complete radial pattern with precise parallel joints between the barrel staves 104A-N, completing a 360-degree loop. The goal for machining the barrel stave 104B is to remove as little material as possible while reversing a cupping. When the barrel stave 104B is reversed, the cupping corresponds to excess remains from the previous radius of the circumference of the barrel stave 104B before being reversed. It is important that the outside edges of the barrel stave 104B is properly machined/re-shaped to remove the previous cupping.

When a new joint side angle is machined on the two longitudinal sides of the barrel staves 104A-104N, the new barrel stave 104C (as shown in FIG. 3D) will have a slightly curved surface in the opposite direction. The surfacing for the machining process may be machined by either rotary planning or CNC surfacing. The material may be removed by sanding, sawing, CNC machining, and the like. In an example, removing no more than about 2 mm to about 4 mm of the material would be ideal to maintain the overall thickness of the barrel stave 104C.

Figure 7:
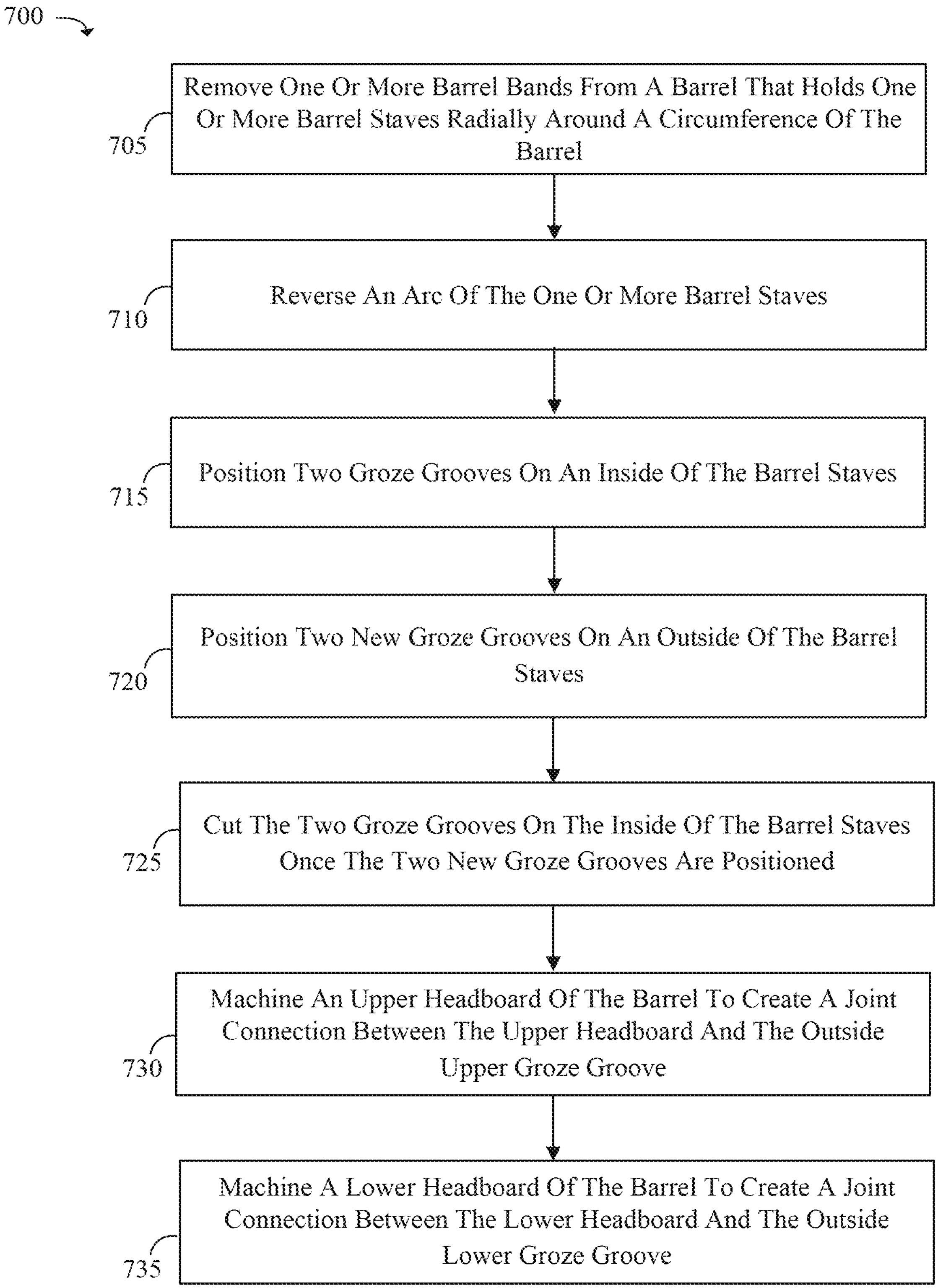
FIG. 7 illustrates a flowchart illustrating a method for recycling a barrel by reversing the one or more barrel staves, in accordance with an embodiment of the present disclosure.

Referring to FIG. 7, FIG. 7 illustrates a flowchart illustrating a method 700 for recycling a barrel 100 by reversing the one or more barrel staves 104A-104N, in accordance with an embodiment of the present disclosure. Steps 705-735 of the method 700 are explained in further detail below.

At step 705, the barrel bands 102A-N are removed from the barrel 100 with barrel staves 104A-N oriented circumferentially to form a side of the barrel 100. The barrel bands 102A-102N may be removed by sliding from an inner position on an outside of the barrel 100 to a smaller end portion of the barrel 100. In an example, the barrel 100 may have around six bands including four barrel bands 102A-N and two strength bands 106A-B on the barrel 100, in which three bands are present on each side of the barrel 100. The strength bands 106A-B may also be removed from the barrel 100.

At step 710, an arc of the barrel staves 104A-N is reversed. The barrel staves 104A-N have a curved longitude arc with the sides at a specific angle which when assembled in a radial pattern create the shape of the barrel 100. This longitudinal arc or radius of the barrel staves 104A-N needs to be reversed. This reversing of the arc may be achieved by steaming the barrel staves 104A-N firstly flat. The barrel staves 104A-N will be subjected to warm/hot steam (typically a timed period in an enclosed chamber) in which the barrel staves 104A-N will be softened. This softening causes the barrel staves 104A-104N to be bent into a semi flat position. This flat orientation will allow for easier machining of the barrel staves 104A-N surface, side joint angle, overall profile, and length. Typically, machining on a flat component is easier than machining on a component with curved arcs and radiuses.

At step 715, two groze grooves 204A-204B are positioned on an inside 302 of the barrel staves 104A-104N (as shown in FIG. 3A). The two groze grooves 204A-B include an inside upper groze groove 204A and an inside lower groze groove 204B. The inside upper groze groove 204A is positioned near the top end 202A of the barrel stave 104A and the inside lower groze groove 204B is positioned near the bottom end 202B of the barrel stave 104A. The two groze grooves 204A-204B may be a narrow indentation that is built into the inside of the barrel stave 104A. The main purpose for having the two groze grooves 204A-204B is to allow other components or materials (for example, headboards) to be guided into it. The headboards help in securely holding the barrel staves 104A-104N in their respective places, thereby increasing the strength of the barrel 100.

At step 720, two new groze grooves 206A-206B are positioned on an outside 304 of the one or more barrel staves 104A-104N (as shown in FIG. 3B). In an embodiment, the new groze grooves 206A-B includes an outside upper groze groove 206A and an outside lower groze groove 206B. The outside upper groze groove 206A is positioned near a second top end 202C of the barrel stave 104B and the outside lower groze groove 206B is positioned near the second bottom end 202D of the barrel stave 104B. The outside upper groze groove 206A of the barrel stave 104B is positioned further from the top end 202A than the inside upper groze groove 204A that is on the inside 302 of the barrel stave 104B. In an example, the inside upper groze groove 204A is between about 25 mm and about 30 mm, between about 5 mm and about 30 mm, or between about 10 mm and about 30 mm further from the top end 202A than the outside upper groze groove 206A. Further, the inside lower groze groove 204B of the barrel stave 104B is positioned further from the bottom end 202B than the outside lower groze groove 206B. In an example, the inside lower groze groove 204B of the barrel stave 104B is between about 25 mm and about 30 mm, between about 5 mm and about 30 mm, or between about 10 mm and about 30 mm further from the bottom end 202B than the outside lower groze groove 206B.

Placement of the two new groze grooves 206A-B between about 25 mm to about 30 mm away from the top end 202A/bottom end 202B helps in maintaining the strength of the barrel stave 104B. As the barrel head position is moved inward, the diameter and circumference of an interior of the barrel 100 increases due to its natural barrel arching shape. The problem of having to move the groze grooves 204A-204B can then be solved by moving the new groze grooves 206A-206B inward relative to the original groze grooves. The barrel staves 104A-104N of the barrel 100 are machined to allow them to fit in a reverse barrel shape, which reduces the width of each barrel stave 104A-104N. In one embodiment, only the original barrel staves 104A-104N are used, which decreases the circumference of the barrel 100 since the sides of each stave 104A-104N are machined. In another embodiment, additional barrel staves 104A-104N are added to maintain the original circumference of the barrel 100.

At step 725, the two groze grooves 204A-204B are cut once the two new groze grooves 206A-206B are positioned (as shown in FIG. 3C). The inside upper groze groove 204A is cut at a first cut location 306A on the inside 302 of the barrel stave 104B. The inside lower groze groove 204B is cut at a second cut location 306B on the inside 302 of the barrel stave 104B. When the barrel stave 104A (for FIG. 3A) is reversed, the two groze grooves 204A-204B will be on the wrong side as they are along the inside 302 of the barrel 100. That is the reason for creating the two new groze grooves 206A-206B on the outside 304 of the barrel 100. Once the two new groze grooves are created on the outside 304 of the barrel 100, the end portion of the staves that include the previous two groze grooves 204A-204B are not further required and are cut at the respective cut locations 306A, 306B.

At step 730, an upper headboard 502 of the barrel 100 is machined to create a joint connection between the upper headboard 502 and the outside upper groze groove 206A of the barrel stave 104A. At step 735, a lower headboard 504 of the barrel 100 is machined to create a joint connection between the lower headboard 504 and the outside lower groze groove 206B (refer to FIG. 5). The upper headboard 502 and the lower headboard 504 both assist in holding the barrel staves 104A-104N securely in place. After the reversing process, there may be possibilities that the barrel staves 104A-104N cannot be supported alone. As the headboards 502, 504 securely hold the barrel staves 104A-104N. the joint connections created by the headboard 502, 504 may thus help in retaining liquids held inside the barrel 100.

Further, it is important to keep the headboards 502, 504 safe from other exposures, which may tend to damage the headboards 502, 504, Thus, about 1 mm to about 2 mm of material from the face of the new wood headboards 502, 504 is removed for creating a clean flat surface. This clean flat surface may then be sanded. Prior to the sanding, the clean flat surface may be surfaced for giving a cosmetic look and feel.

Further, a layer of wood is removed from the outer side of the barrel staves 104A-N. The wood may be removed by sanding or sawing. In an example, about 2 mm to about 4 mm or about 1 mm to about 4 mm of wood is removed and ideal to maintain an overall thickness of the barrel staves 104A-N. Further, a positive effect can arise by reducing the thickness of the wood stave on the barrel 100. Wood staves are commonly 27 millimeters in thickness though some staves are as thin as 22 millimeters in thickness, which will accelerate the oxygen ingress and transfer. This increased oxygen transfer can have a positive effect on the liquid inside the barrel 100.

In an embodiment, the head of the barrel 100 may be re-machined to include a groze bevel. This primarily creates a perfect match with the new groze grooves 206A-206B on the new wood barrel stave 104C. A similar bevel will be machined on the barrel headboards 502, 504 removing as little material as possible while creating a clean and precise joint connection for the new groze grooves 206A-206B. This joint will need to be precise as it will need to retain liquids inside the barrel 100.

In an embodiment, once the barrel 100 is converted into the recycled barrel, a water pressure test is conducted on the recycled barrel. The water pressure test is conducted for checking for liquid leaks in the recycled barrel. The water pressure test may be performed while filing the barrel 100 with water or any liquid, increasing the water pressure/liquid pressure for a particular duration, and then released. The determined water/liquid pressure is then compared with a threshold pressure limit. If the pressure is greater than the threshold pressure limit, then this may indicate that the water/liquid inside the barrel 100 needs to be reduced.

The device and method described herein above has several technical advantages. The device and method described therein discloses a process and technique in which a wooden barrel of multiple sizes and shapes can be turned inside out. The process of turning the barrel inside out is unique and the result yields a perfectly satisfactory recycled wood barrel which has the same characteristics of a new wine barrel. The relevance for this unique process of turning the barrel inside out is that the outside wood of the barrel is still perfectly usable. Since the exterior of the barrel has not been exposed to the aging and storing process of the liquid, the wood is like new wood on the outside of the barrel. Thus, if the barrel can be turned inside out, there will be fresh wood on the inside where it can impart new wood flavors on the liquid and the old, exposed wood from the inside will now be on the outside. This unique process makes more efficient use of the wood in a wine barrel as majority of the wood barrel staves thickness is primarily for structural strength. The reason for the thickness of the stave is primarily to create barrel strength, allowing them to be rugged and stacked in piles under heavy load.

The liquid inside of the barrel rarely penetrates more than 3-4 mm deep into the surface of the interior stave wall. The typical stave thickness is approximately 27 mm thick, which means there is perfectly serviceable wood remaining on the outside that can still be used. Typical wood barrels can range in size from 50 liters up to 4,000 liters or more. The majority common size barrel is the Burgundy style barrel or the Bordeaux style barrel, which is about 225 liters. Wood barrels can vary widely in value depending on where the wood came from, how tight the grain pattern is, and how long the wood was air dried and aged before it was turned into a barrel.

When considering the sustainability aspect of the barrel industry, this unique process doubles the lifespan of a barrel. This process significantly reduces the wine barrel industry carbon footprint and responsibly conserves tree harvesting from which barrels are made.

Further, the new wood on the inside goes through a toasting process during assembly of the barrel. This process is achieved by setting the barrel over an actual small fire. The heat from the fire toasts and chares the inside of the barrel, which brings out the wood flavors enhancing the flavor profile of the liquid in the barrel. The toasting process can also come from other heating sources like natural gas, propane, or radiant heat.

The foregoing description of the embodiments has been provided for purposes of illustration and not intended to limit the scope of the present disclosure. Individual components of a particular embodiment are generally not limited to that particular embodiment, but, are interchangeable. Such variations are not to be regarded as a departure from the present disclosure, and such modifications are considered to be within the scope of the present disclosure.

The embodiments herein and the various features and advantageous details thereof are explained with reference to the non-limiting embodiments in the following description. Descriptions of well-known components and processing techniques are omitted so as to not obscure the embodiments herein. The examples used herein are intended merely to facilitate an understanding of ways in which the embodiments herein may be practiced and to further enable those of skill in the art to practice the embodiments herein. Accordingly, the examples may not be construed as limiting the scope of the embodiments herein.

The foregoing description of the specific embodiments so fully reveal the general nature of the embodiments herein that others can, by applying current knowledge, readily modify and/or adapt for various applications such specific embodiments without departing from the generic concept, and, therefore, such adaptations and modifications may and are intended to be comprehended within the meaning and range of equivalents of the disclosed embodiments. It is to be understood that the phraseology or terminology employed herein is for the purpose of description and not of limitation. Therefore, while the embodiments herein have been described in terms of embodiments, those skilled in the art will recognize that the embodiments herein can be practiced with modification within the spirit and scope of the embodiments as described herein.

Any discussion of documents, acts, materials, devices, articles or the like that has been included in this specification is solely for the purpose of providing a context for the disclosure. It is not to be taken as an admission that any of these matters form a part of the prior art base or were common general knowledge in the field relevant to the disclosure as it existed anywhere before the priority date of this application.

The numerical values mentioned for the various physical parameters, dimensions or quantities are approximations and it is envisaged that the values higher/lower than the numerical values assigned to the parameters, dimensions or quantities fall within the scope of the disclosure, unless there is a statement in the specification specific to the contrary.

While considerable emphasis has been placed herein on the components and component parts of the embodiments, it will be appreciated that many embodiments can be made and that many changes can be made in the embodiments without departing from the principles of the disclosure. These and other changes in the embodiment as well as other embodiments of the disclosure will be apparent to those skilled in the art from the disclosure herein, whereby it is to be distinctly understood that the foregoing descriptive matter is to be interpreted merely as illustrative of the disclosure and not as a limitation.

The invention claimed is:

1. A method for recycling a barrel, the method comprising:

removing one or more barrel bands from the barrel that holds one or more barrel staves radially around a circumference of the barrel, wherein the one or more barrel bands are removed by sliding from an inner position on an outside of the barrel to a smaller end portion of the barrel;

reversing an arc of the one or more barrel staves;

determining a joint side angle of the one or more barrel staves; and machining the joint side angle on two longitudinal sides of the barrel staves such that the barrel staves are assembled into a recycled barrel such that the outside of the barrel staves faces an inside of the recycled barrel.

2. The method of claim 1, further comprising sanitizing the barrel prior to removing the one or more barrel bands from the barrel.

3. The method of claim 1, further comprising:

steaming each barrel stave; and causing each barrel stave to be bent into a semi flat position.

4. The method of claim 1, wherein the joint side angle is determined by dividing 360 degrees by a product of a number of barrel staves and two.

5. The method of claim 1, further comprising removing a layer of wood from the outside of the one or more barrel staves, wherein the layer is between about 2 mm to about 4 mm.

6. The method of claim 1, further comprising:

positioning two groze grooves on the inside of the barrel staves, wherein the two groze grooves comprise an inside upper groze groove near a top end of the barrel staves and an inside lower groze groove near a bottom end of the barrel staves;

positioning two new groze grooves on the outside of the barrel staves after the arc of the barrel staves is reversed, wherein the two new groze grooves comprise an outside upper groze groove near a second top end of the barrel staves and an outside lower groze groove near a second bottom end of the barrel staves; and cutting the two groze grooves on the inside of the barrel staves once the two new groze grooves are positioned.

7. The method of claim 6, wherein the second top end is between about 25 mm to about 30 mm further inward than the top end.

8. The method of claim 6, wherein the second bottom end is between about 25 mm to about 30 mm further inward than the bottom end.

9. The method of claim 6, further comprising:

machining an upper headboard of the barrel to create a joint connection between the upper headboard and the outside upper groze groove of each of the barrel staves; and machining a lower headboard of the barrel to create the joint connection between the lower headboard and the outside lower groze groove of each of the barrel staves, and wherein the recycled barrel comprises the upper headboard and the lower headboard.

10. The method of claim 1, wherein the recycled barrel has a smaller radius than the barrel.

11. The method of claim 1, wherein the recycled barrel comprises a strength band that is positioned at each end of the recycled barrel.

12. The method of claim 11, wherein each strength band has a cross section that comprises:

a first portion that is positioned against the barrel staves; and a second portion that is oriented perpendicular to a longitudinal axis of the recycled barrel.

13. The method of claim 12, wherein the first portion and the second portion of the cross section are oriented to form an “L” shape.

14. A barrel comprising:

one or more barrel staves comprising recycled barrel staves that were previously removed from a salvaged barrel;

one or more barrel bands that hold the one or more barrel staves around a circumference of the barrel, and wherein the recycled barrel staves are reversed such that their inner side faces an outside of the salvaged barrel; and a strength band that is positioned at each end of the barrel;

wherein each strength band has a cross section that comprises:

a first portion that is positioned against the side of the barrel; and a second portion that is oriented perpendicular to a longitudinal axis of the barrel, and wherein the first portion and the second portion of the cross section are oriented to form an “L” shape.

15. The barrel of claim 14, wherein the barrel staves comprise a top end, a bottom end, two groze grooves, and two new groze grooves.

16. The barrel of claim 15, wherein the two groze grooves comprise an inside upper groze groove near a top end of the barrel staves and an inside lower groze groove near a bottom end of the barrel staves; and wherein the two new groze grooves comprise an outside upper groze groove near a second top end of the barrel staves and an outside lower groze groove near a second bottom end of the barrel staves.

17. The barrel of claim 16, wherein the inside upper groze groove of each of the recycled barrel staves is positioned further from the top end than the outside upper groze groove that is on the outside; and wherein the inside lower groze groove of each of the recycled barrel staves is positioned further from the bottom end than an outside lower groze groove that is on the outside.

18. The barrel of claim 16, wherein the inside upper groze groove of each of the recycled barrel staves is between about 25 mm to about 30 mm further from the top end than the outside upper groze groove; and wherein the inside lower groze groove of each of the recycled barrel staves is between about 25 mm to about 30 mm further from the bottom end than the outside lower groze groove.

19. A method for recycling a barrel, the method comprising:

removing one or more barrel bands from the barrel that holds one or more barrel staves radially around a circumference of the barrel, wherein the one or more barrel bands are removed by sliding from an inner position on an outside of the barrel to a smaller end portion of the barrel, and wherein the barrel staves comprise recycled barrel staves that were previously removed from a salvaged barrel;

reversing an arc of the one or more barrel staves;

positioning two groze grooves on an inside of the barrel staves, wherein the two groze grooves comprise an inside upper groze groove near a top end of the barrel staves and an inside lower groze groove near a bottom end of the barrel staves;

positioning two new groze grooves on the outside of the barrel staves, wherein the two new groze grooves comprise an outside upper groze groove near a second top end of the barrel staves and an outside lower groze groove near a second bottom end of the barrel staves, wherein the second top end is between about 25 mm to about 30 mm further inward than the top end, and wherein the second bottom end is between about 25 mm to about 30 mm further inward than the bottom end;

cutting the two groze grooves on the inside of the barrel staves once the two new groze grooves are positioned;

machining an upper headboard of the barrel to create a joint connection between the upper headboard and the outside upper groze groove of each of the barrel staves; and machining a lower headboard of the barrel to create the joint connection between the lower headboard and the outside lower groze groove of each of the barrel staves, wherein the recycled barrel comprises the upper headboard and the lower headboard.

* * * * *